(12) United States Patent
Hosoi et al.

(10) Patent No.: US 7,124,957 B2
(45) Date of Patent: Oct. 24, 2006

(54) APPARATUS FOR READING A COLOR SYMBOL

(75) Inventors: Kazukuni Hosoi, Saitama Pref. (JP); Haruo Matsuoka, Saitama Pref. (JP)

(73) Assignee: Optoelectronics Co., Ltd.

( * ) Notice: Subject to any disclaimer, the term of this patent is extended or adjusted under 35 U.S.C. 154(b) by 0 days.

(21) Appl. No.: 10/996,802

(22) Filed: Nov. 24, 2004

(65) Prior Publication Data

US 2006/0108423 A1 May 25, 2006

(51) Int. Cl.
*G06K 19/06* (2006.01)
*G06K 7/10* (2006.01)

(52) U.S. Cl. .................. 235/492; 235/235; 235/462.01; 235/462.08; 235/470

(58) Field of Classification Search ................ 235/492, 235/462.04, 494, 469, 462.06, 470, 484, 235/270, 469.4, 462.01
See application file for complete search history.

(56) References Cited

U.S. PATENT DOCUMENTS

| | | | | |
|---|---|---|---|---|
| 5,568,555 A | * | 10/1996 | Shamir | 380/51 |
| 5,576,528 A | * | 11/1996 | Chew et al. | 235/469 |
| 5,714,745 A | * | 2/1998 | Ju et al. | 235/462.04 |
| 5,992,748 A | * | 11/1999 | Takahashi et al. | 235/462.04 |
| 6,062,475 A | * | 5/2000 | Feng | 235/462.06 |
| 6,478,223 B1 | * | 11/2002 | Ackley | 235/462.04 |
| 6,793,138 B1 | * | 9/2004 | Saito | 235/470 |
| 2002/0186309 A1 | * | 12/2002 | Keshet et al. | 348/272 |
| 2003/0052179 A1 | * | 3/2003 | Pinson | 235/494 |
| 2004/0200904 A1 | * | 10/2004 | Pinson | 235/494 |

FOREIGN PATENT DOCUMENTS

| | | |
|---|---|---|
| JP | 6-236452 | 8/1994 |
| JP | 9-161002 | 6/1997 |
| JP | 2004-120797 | 4/2004 |

OTHER PUBLICATIONS

International Search Report + opinion, Feb. 14, 2006, Optoelectronics Co., Ltd.

* cited by examiner

*Primary Examiner*—Jared J. Fureman
*Assistant Examiner*—Allyson Trail
(74) *Attorney, Agent, or Firm*—Kaplan, Gilman, Gibson & Dernier LLP

(57) ABSTRACT

The present invention provides an apparatus for reading a color symbol, which comprises a matrix of color filters arranged in front of a detector. Light received from the filters of some colors is used to locate the color symbol, while light received from all the filters is used to read and decode the located symbol. Preferably, the filters used for locating the symbol are of the colors to which the detector is most sensitive. Preferably, the filters for locating the symbol are dominant in number.

10 Claims, 2 Drawing Sheets

APPARATUS FOR READING A COLOR SYMBOL

TECHNICAL FIELD OF THE INVENTION

The present invention relates to symbol reading and decoding techniques, and more particularly, to apparatus for reading color symbols, such as color one and two dimensional barcodes, with higher sensitivity and resolution.

BACKGROUND OF THE INVENTION

Barcodes, with various desired information encoded therein, are universally used in many circumstances. There are many types of barcodes, such as 1-D barcodes stacked barcodes, 2-D barcodes, etc. These barcodes are usually monochrome symbols that are encoded with information in specified patterns of barcode elements (or cells) of two sharply contrasted colors such as black and white. To increase the "information density" (i.e., the information included in the limited symbol area), various colors are also used as the barcode elements in color barcodes. The color barcodes are usually also read by monochrome readers which identify different colors by different levels of electrical signals generated from light reflected from the symbol elements of different colors. However, the sensitivity and resolution of reading color symbols by monochrome readers is not satisfactory, especially when the color symbols are buried in a colorful background such as a color picture.

One technique of reading such color symbols employs plural primary color filters, such as Red-Green-Blue filters. A drawback of such an arrangement is that significant loss of sensitivity results from the filtering of the light reflected from the symbol.

Therefore, there exists a need for a reading system that can read a color symbol with high sensitivity and resolution, even if the color symbol is buried in a colorful background.

SUMMARY OF THE INVENTION

The present invention provides an apparatus for reading a color symbol, which comprises a matrix of color filters provided in front of a detector. According to the teachings of the present invention, light received from the filters of some colors is used to locate the color symbol, while light received from other filters or all the filters is used to read and decode the located symbol.

Preferably, the colors of the filters used for locating the symbol are in the range of wavelengths at which the detector is most sensitive. Preferably, the filters for locating the symbol are of the same color, which is preferably of a wavelength of the detector.

Preferably, the pattern of the filters for locating the symbol is of a zigzag pattern, which is a part of the whole filter matrix.

Preferably, one color of filters is used to locate the symbol, and all the filters are used to decode it.

DETAILED DESCRIPTION OF THE INVENTION

Figure 1:
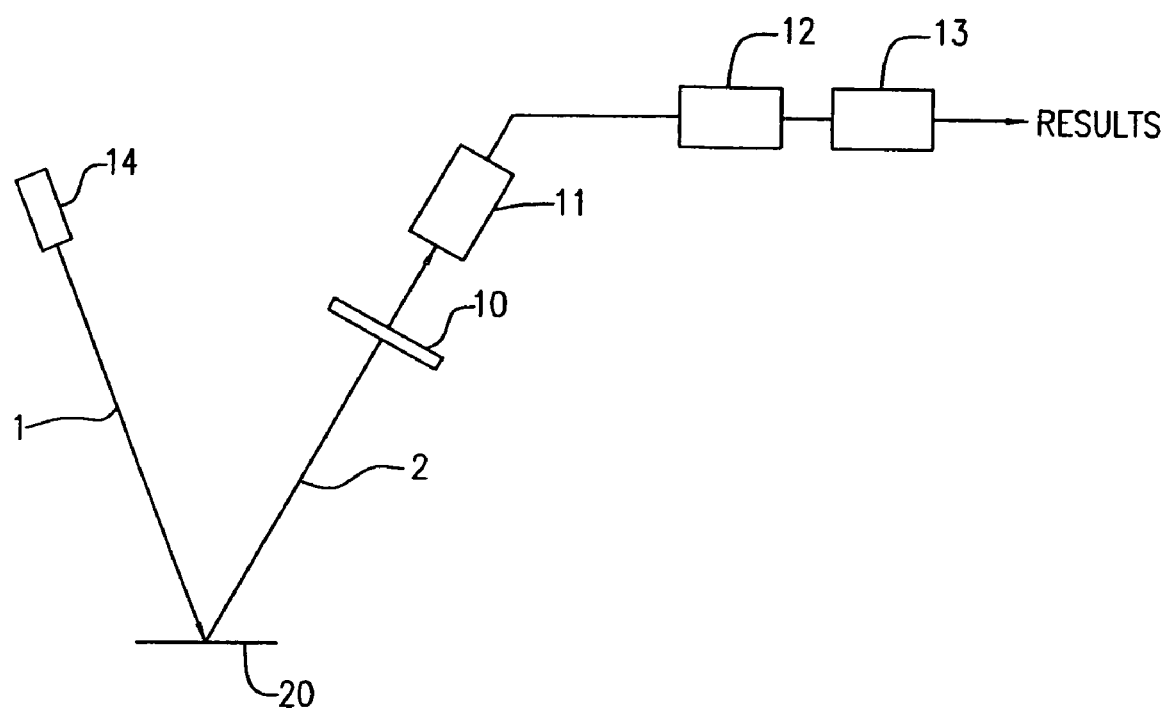
FIG. 1 schematically illustrates an exemplary color symbol reading system according the concept of the present invention.

An embodiment of the color symbol reading apparatus according to the present invention is schematically illustrated in FIG. 1, which generally comprises a light source 14 (such as LED) for projecting light 1 to a color symbol (such as a color barcode) 20, a detector 11 for receiving light 2 reflected from the symbol 20 and for generating electrical signals from the received reflectance light 2, an amplifier circuitry 12 for amplifying the signals generated by the detector 12, and a decoding circuit 13 for decoding the amplified electrical signals received from the amplifier circuitry 12 to obtain a reading result.

According to the present invention, a color filter array (CFA) or filter matrix 10 which comprises filters of various colors is provided in front of the detector 11 for filtering the reflectance light 2 before it is received by the detector 11. Only the light passing the filters of some (but not all) colors are utilized to locate the color symbol 20, while the light passing all the filters are utilized to read and decode the symbol 20.

Figure 2:
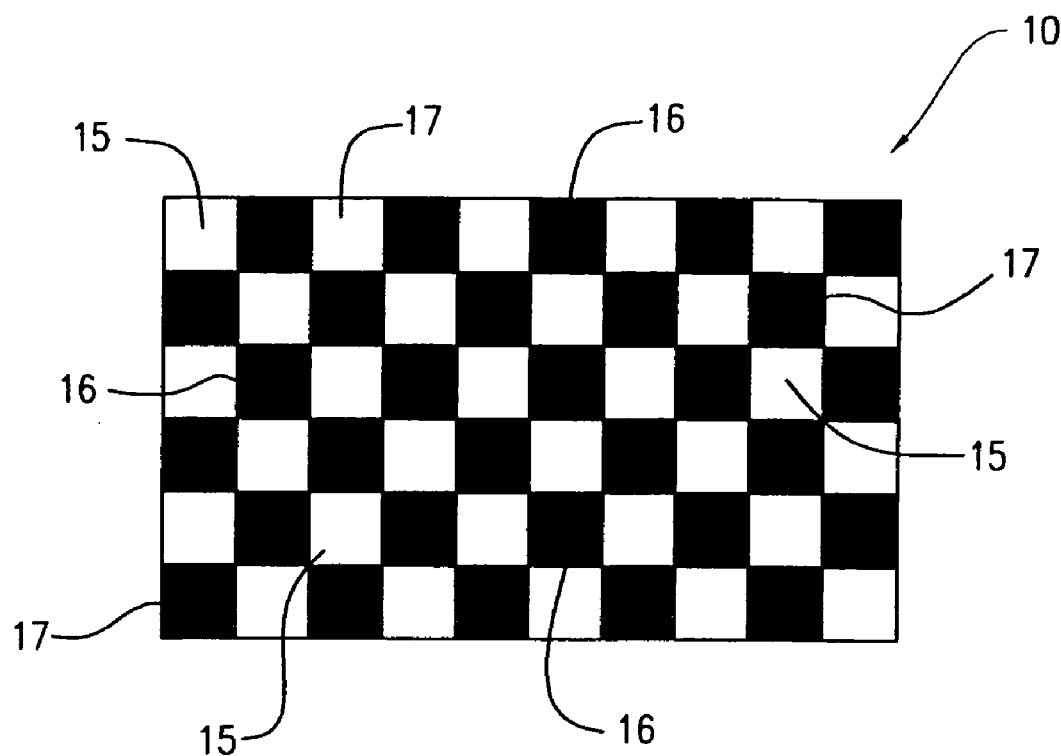
FIG. 2 illustrates a matrix of filters of an embodiment according to the present invention.

An exemplary embodiment of the filter matrix 10 is illustrated in FIG. 2, which comprises filters of three different colors, i.e., the three component colors Cyan, Yellow, Magenta of CYM color system, which is expected to pass through more light than RGB filter system. In FIG. 2, yellow filters are represented by "white" squares 15, cyan filters by "gray" squares 16, and magenta filters by "dark" squares 17. For clarity, only some of the filters are designated by reference numbers 15, 16 and 17.

Noticeably in FIG. 2, yellow filters 15 are dominant in number throughout the area of the filter matrix 10. In the example here, there are twice as many filters of yellow color as of each of the other two colors. The yellow filters 15 subtract blue color in principle and pass other spectrum of light onto the detector 11. In this preferred embodiment, the reflectance light 2 that passes the yellow filters 15 to be received by the detector 11 is utilized to locate the colored symbol 20. The symbol 20 is located as a whole symbol block but not by symbol elements. In this embodiment, detector 11 has a dominant sensitivity for the colors passing through the yellow filter. Thus, a high sensitivity of the detector in locating the color symbol 20 is achieved.

After the color symbol 20 is located by the light 2 passing the yellow filters 15, the light 2 that passes all the color filters 15, 16 and 17 in the filter matrix 10 is utilized to read and decode the colored symbol 20, which achieves a higher resolution as compared to prior color symbol readers.

Figure 3:
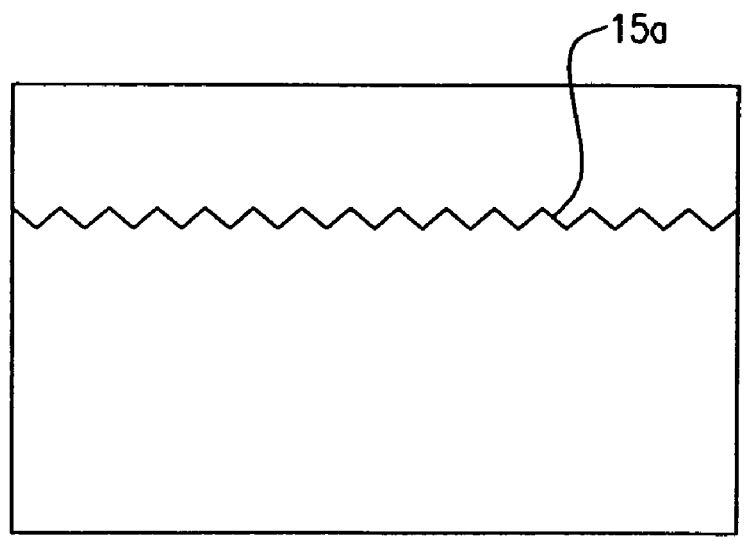
FIG. 3 illustrates a zigzag line resulted from the zigzag pattern of the dominant color filters in the matrix of FIG. 2.

In order to calculate run-length with minimum noise, pixels of the same color should be used. To this end, as illustrated in FIG. 2, the dominant yellow filters 15 are preferably arranged in the filter matrix in a zigzag pattern both horizontally and vertically. This generates a zigzag line 15a (see FIG. 3) for calculating run-length with minimum noise. Once a finder of the barcode or color symbol 20 is found, the colors of the symbol 20 can be then evaluated, which is useful for remaining processing of the symbol 20.

Though the yellow filters 15 are utilized as the dominant color filters in the preferred embodiment illustrated in FIG. 2, any other color (such as cyan or magenta) may also be used as a dominant color to locate the colored symbol 20. Preferably, the detector 11 has the most sensitivity for the wavelength of the same color of the dominant color filter, or is the most sensitive to the color of the dominant color filters.

Other color systems can also be utilized. For example, filters can have red, green and blue colors as in an RGB color system, with one (e.g., red) of the colors as the color of the dominant filters for locating the symbol 20. Filter matrices containing more than three types of filters could also be employed. It is desirable, although not critical to the present invention, that the wavelength at which the detector 11 is most sensitive and the filter used to locate the symbol have similar wavelengths, in order to maximize the sensitivity.

Alternatively, the matrix filters 10 may comprise more than three colors and the filters for locating the symbol 20 may comprise more than one color (such as yellow in FIG. 2). For example, the filters for locating the symbol 20 may comprise filters of several different colors. If so, the colors are preferably close to each other and the detector 11 is more sensitive to them than other colors.

Though the above describes the preferred embodiments of the present invention, it will be appreciated that, without departing the spirit of the present invention, numerous adaptations, variations and modifications are readily available to a person with ordinary skill in the art. For example, the color filters 15, 16, 17 can be of other types of patterns other than that shown in FIG. 2, such as honeycomb pattern. The color symbol 20 can be a linear barcode of any dimension, a stacked barcode, a matrix barcode, etc., buried in a colorful background or not. The filters used for locating the color symbol 20 may or may not be dominant in number as compared to other filters. Therefore, the scope of the present invention is intended to be solely defined in the accompanying claims.

The invention claimed is:

1. An apparatus for finding and decoding a symbol comprising a matrix of light filters of plural wavelengths, wherein light received through filters of a first set of said wavelength filters is used for locating the symbol to be read, and light received through a second set of said filters is utilized to read or decode said symbol; wherein said first set is less than all of the filters and wherein said second set includes all of the filters.

2. Apparatus of claim 1 wherein said first set is comprised of filters that are all of the same wavelength.

3. Apparatus of claim 2 wherein said first set of filters is comprised of Yellow filters.

4. Apparatus of claim 2 wherein said first set of filters forms a zig-zag pattern.

5. Apparatus for reading a color symbol comprising a patterned arrangement of filters of plural colors, and software for first processing light received through less than all of said filters to locate the color symbol, and then processing light received through all filters to decode said color symbol, wherein the light received through less than all of the filters is of a wavelength to which a detector located behind said filters is more sensitive than said detector is to light received through the remaining filters.

6. Apparatus for reading a color symbol comprising patterned arrangement of filters of plural colors, and software for first processing light received through less than all of said filters to locate the color symbol, and then processing light received through all filters to decode said color symbol, and wherein the patterned arrangement is a matrix and wherein the filters to which said detector is more sensistive all allow passing of substantially the same wavelength of light, and wherein filters of one dominant color occupy a zig-zag pattern within said matrix, and filters of at least two other colors occupy remaining portions of said matrix.

7. An apparatus for reading a color symbol comprising an arrangement of filters of at least three colors, wherein filters of a first of said three colors occupy more of said arrangement than filters of a second and third colors, and wherein filters of said first color are used to locate said symbol being read.

8. The apparatus of claim 7 wherein said filters of a second and third color are used to read said located symbol.

9. The apparatus of claim 8 wherein filters of said first, second, and third colors are used to read said located symbol.

10. The apparatus of claim 9 wherein said filters are of the colors Cyan, Yellow, and magenta, and wherein said filter of said first color is yellow.

* * * * *